United States Patent [19]

Vandenhoeck

[11] 4,158,385

[45] Jun. 19, 1979

[54] ENERGY RECOVERY AND STORAGE SYSTEM

[76] Inventor: Jean-Paul Vandenhoeck, 3 Shell Beach Rd., Guilford, Conn. 06437

[21] Appl. No.: 859,222

[22] Filed: Dec. 9, 1977

[51] Int. Cl.² ........................................... F28D 13/00
[52] U.S. Cl. .................................. 165/39; 165/107 R
[58] Field of Search .................................. 165/107, 39

[56] References Cited

U.S. PATENT DOCUMENTS

| | | | |
|---|---|---|---|
| 3,444,048 | 5/1969 | Schmeling | 165/107 X |
| 3,488,042 | 1/1970 | Brzozowski | 165/107 X |
| 3,908,632 | 9/1975 | Poulsen | 165/107 X |
| 3,981,355 | 9/1976 | Squires | 165/107 X |

*Primary Examiner*—Alan Cohan
*Attorney, Agent, or Firm*—Lerner, David, Littenberg & Samuel

[57] ABSTRACT

A waste heat recovery and storage system is provided which utilizes a first reactor, a second reactor, and an insulated storage device disposed between the first and second reactors. In the preferred embodiment, particulate material to be heated is supplied to pass through the first reactor. In addition, hot waste gases are circulated through the first reactor so that the particulate material passing through the first reactor thermally interacts with and receives heat energy from the hot waste gases. The heated particulate material is then transferred from the first reactor to an insulated storage device which operates to store the heated particulate material and to utilize same as it is needed to supply heat energy to a working fluid. When there is a demand for such heat energy, the heated particulate material is transferred from the insulated storage device to a second reactor to pass therethrough. At the same time, a working fluid to be heated is circulated through the second reactor and thermally interacts with and receives heat energy from the heated particulate material. The heated working fluid is then supplied to a utilization point. After the particulate material has passed through the second reactor and has given up its heat energy to the working fluid, the cooled particulate material is returned from the second reactor to the first reactor so that it can be recycled and reused. In an alternative embodiment, the particulate material may be cooled in the first reactor to cool the working fluid in the second reactor.

25 Claims, 1 Drawing Figure

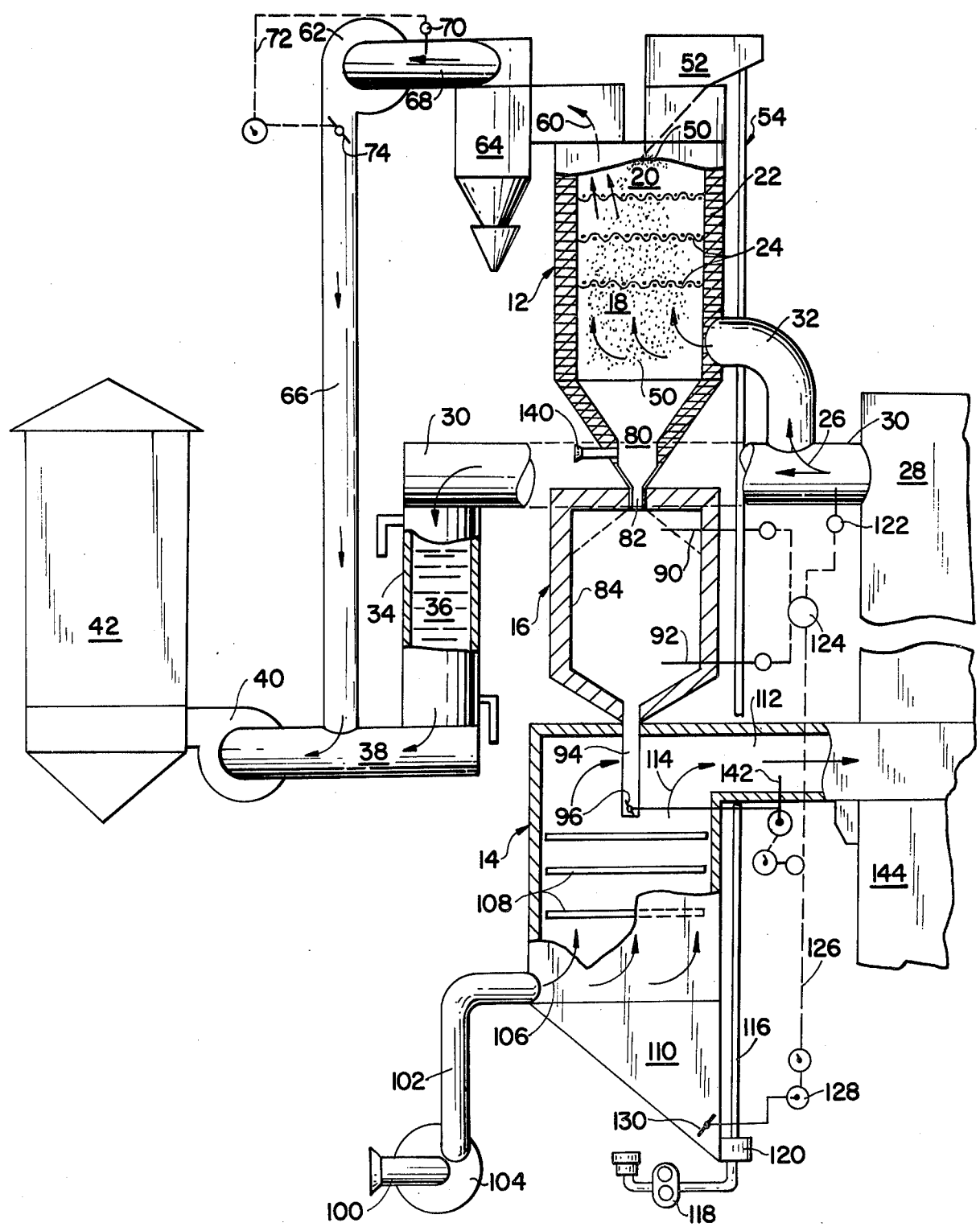

ENERGY RECOVERY AND STORAGE SYSTEM

FIELD OF THE INVENTION

The present invention relates generally to the heat-exchange art, and specifically to an improved method and apparatus for recovering and storing heat energy from a heat supply which is normally dissipated and utilizing said recovered heat energy to maintain a working fluid at a substantially constant output temperature, even though the temperature of the heat supply may vary.

BACKGROUND OF THE INVENTION

In the prior art, the use of reactors or vessels in which a thermal interaction or thermal exchange between materials takes place is well known. Such reactors may be of the type in which particulate material is introduced, and a gas having a different temperature than that of the particulate material is directed to pass through the particulate material so that a thermal interaction takes place between the particulate material and the gas. This type of thermal interaction is referred to as countercurrent flow and is described in detail in U.S. Pat. No. 3,876,383.

In the prior art, it is also known to place two of such heat-exchange reactors in relation to each other so that the particulate material, after it is heated by a waste gas or fluid in one reactor, is transferred to the second reactor, where the particulate material gives up its heat to a working fluid. However, there are a number of drawbacks with such an arrangement.

More particularly, the temperature of the waste gas supplied to the first reactor typically varies and is not useful to impart heat energy to the particulate material until the waste gas reaches a sufficient temperature. However, during the time that the incoming waste gas is not of a sufficiently high temperature, heated particulate material cannot be supplied to the second reactor to heat the working fluid in that reactor. As a result, in such arrangements, a continuous supply of heated working fluid cannot be provided. In addition, in such prior art arrangements, all of the hot waste gases are drawn into the first reactor to heat the particulate material, even though, at certain times, only a portion of such waste gases may be required to meet the demands of the system. It would therefore be desirable to provide a system wherein a continuous supply of heated working fluid is provided and a system wherein only that part of the waste gases are utilized which are required to meet the demands of the system so that any remaining hot waste gases which are not utilized in the first reactor can be used for another purpose.

Accordingly, it is an object of the present invention to provide an improved system which overcomes the aforesaid problems. Specifically, it is within the contemplation of the present invention to provide a system which utilizes an incoming hot gas having a varying temperature to store heat energy and to transfer same, as needed, to a working fluid to maintain the working fluid at a substantially constant temperature.

It is a further object of the present invention to provide a waste heat recovery and storage system which uses only that portion of the incoming hot waste gas required to meet the demands of the system to maintain the working fluid at a constant temperature, so that the unused hot incoming gas may be utilized for another purpose, such as being supplied to another heat exchanger.

It is a still further object of the present invention to provide a waste heat recovery system wherein a portion of the incoming hot waste gases is supplied to a first heat exchanger, and the remaining hot waste gases are supplied to a second heat exchanger in parallel with the first heat exchanger, so that each of the parallel heat exchangers receives the hot waste gases at substantially the same temperatures.

It is a still further object of the present invention to provide a waste heat recovery system wherein the reactor receiving the hot waste gases and its peripheral equipment does not have to withstand high temperatures, since unneeded and unused hot waste gases are supplied to a parallel heat exchanger.

It is a still further object of the present invention to provide a waste heat recovery system wherein the working fluid heated by the particulate material can have additional heat energy supplied to it by the use of additional heaters or burners.

SUMMARY OF THE INVENTION

Briefly, in accordance with the principles of the present invention, an improved energy recovery and storage system is provided which utilizes a first reactor, a second reactor, and an insulated storage device disposed between the first and second reactors. In a preferred embodiment of the invention, particulate material to be heated is supplied to pass through the first reactor. In addition, hot waste gases, such as those produced by a cupola, are circulated through the first reactor so that the particulate material passing through the first reactor thermally interacts with and receives heat energy from the hot waste gases. The heated particulate material is transferred from the first reactor to an insulated storage device which operates to store the heated particulate material and to utilize same as it is needed to supply heat energy to a working fluid. When there is a demand for such heat energy, the heated particulate material is transferred from the insulated storage device to a second reactor to pass therethrough. At the same time, a working fluid to be heated is circulated through the second reactor and thermally interacts with and receives heat energy from the heated particulate material. The heated working fluid is then supplied to a utilization point. For example, such heated working fluid may be utilized as the combustion air required by the cupola or may be utilized to heat a supply of water in a heat exchanger. After the particulate material has passed through the second reactor and has given up its heat energy to the working fluid, the cooled particulate material is returned from the second reactor to the first reactor so that it can be recycled and reused.

In accordance with the present invention, only that portion of the hot waste gases which is required to meet the system demands is drawn into the first reactor. Accordingly, the level of heated particulate material stored in the storage device of the present invention is sensed and operates to control the rate at which the hot waste gases and particulate material are supplied to the first reactor. In this manner, only that amount of hot waste gases which is required to replenish the heated particulate material in the storage device is drawn into the first reactor. In this connection, the flow rate of heated particulate material from the storage device of the present invention is also sensed and operates to control the flow rate of the particulate material from the second reactor to the first reactor. Therefore, the rate at which the particulate material is returned from the second reactor to the first reactor varies in accordance with the rate at which the heated particulate material is supplied from the insulated storage device to the second reactor to impart heat energy to the working fluid.

In addition, in accordance with the present invention, the rate at which heated particulate material is supplied from the insulated storage device to the second reactor is controlled and varies in accordance with the demands of the system to maintain the working fluid at a predetermined constant temperature.

Advantageously, as a result of the ability to store heat energy in accordance with the present invention, an improved system of recovering waste heat has been provided wherein a working fluid can be maintained at a constant temperature as long as there is stored heat energy even though the incoming hot waste gases vary in temperature. That is, the heat storage capability of the present invention is utilized to provide heat energy to the working fluid to maintain it at a constant temperature even when the temperature of the waste hot gases falls below the required level.

A further advantage of the present invention resides in the fact that the system utilizes only the amount of hot waste gases required to meet the demands of the system, so that any unused hot waste gases can be used for another purpose. For example, such unused hot waste gases can be supplied to a second and parallel heat exchanger, so that the second heat exchanger receives hot waste gases at the same temperature as the first reactor of the present invention.

BRIEF DESCRIPTION OF THE DRAWINGS

Further objects, features, and advantages of the present invention will become apparent upon the consideration of the following detailed description of a presently preferred embodiment, when taken in conjunction with the accompanying drawing, wherein:

The drawing is a schematic and diagrammatic representation of the reactors and storage device of the present invention and the apparatus for controlling same.

DETAILED DISCUSSION OF PREFERRED EMBODIMENTS OF THE INVENTION

Referring to the drawing, there is shown the improved waste heat recovery and storage system of the present invention, generally designated by the reference numeral 10, which includes a first reactor 12, a second reactor 14, and an insulated storage device 16 disposed between reactors 12, 14. Reactors 12, 14 are of the type which provide thermal interaction between particulate solid materials and gases. As shown in this embodiment, upper reactor or regenerator 12 receives hot, dirty exhaust gases, represented by arrow 26, from a cupola 28, which exhaust gases operate to heat a particulate material 50 in reactor 12. The heated particulate material 50 is then supplied to and stored in insulated storage device 16. The lower reactor or recuperator 14 receives the heated particulate material 50 from storage device 16 as needed to supply heat energy to a working fluid, such as a cold gas 106, which is supplied to reactor 14.

Reactors 12, 14 may be of the type described in U.S. Pat. No. 3,876,383, and the disclosure of said patent is incorporated herein with respect to the structual and operational details of reactors 12, 14. Accordingly, reactors 12, 14 will not be discussed in great detail, but only to the extent necessary to understand the present invention. More particularly, upper reactor 12 includes a lower vessel 18 and an upper vessel 20. The walls of lower vessel 18 are lined with refractory brick 22 in order to withstand the high temperatures of the exhaust gases received from the cupola. In addition, as explained in U.S. Pat. No. 3,876,383, lower vessel 18 includes a plurality of stainless steel trays 24 having large perforations, so that the particulate material 50 may pass downwardly through the perforations. As shown, trays 24 are stacked and are separated from each other by a short distance. The hot exhaust gases 26 are received from cupola 28 via suitable conduits 30, 32 and may have a temperature in the range of 600° F. to 1800° F.

As will be explained herein, only a portion of the hot gases 26 is supplied to reactor 12, with the unused portion of gases 26 being supplied by conduit 30 to another heat exchanger 34. This heat exchanger 34 is arranged in parallel with reactor 12 and may be employed for any useful purpose, such as heating water 36. After the gases pass through heat exchanger 34, they are supplied by a suitable conduit 38 and fan 40 to a still further utilization point, if desired. However, as shown herein, the exhaust gases are supplied by conduit 38 to an air pollution control system 42 which operates in a known manner to remove the pollutants from the gases before they are released to the atmosphere.

Although the present invention is being described as receiving hot exhaust gases from a cupola, it should be understood that any fluid may be employed in accordance with the principles of the present invention, which specifically includes gases, liquids, or aerosols. In addition, as will be explained herein, the present invention may be employed to cool a working fluid in reactor 14. Accordingly, in such a case, a cold fluid, rather than a hot fluid, would be supplied via ducts 30, 32 to reactor 12 to cool the particulate material contained therein and to store same in insulated storage device 16 until it is needed in reactor 14 to cool the working fluid contained therein.

Referring now to the particulate material 50 supplied to upper reactor 12, it may be supplied by any suitable apparatus to upper reactor 12. For example, as shown herein, a hopper 52 supplies the particulate material 50 to upper vessel 20 of reactor 12. The particulate material 50 passes through reactors 12, 14 and storage device 16 and is recycled through the system by a suitable conveyor system 54 which returns the particulate material from lower reactor 14 via hopper 52 to upper reactor 12. It should also be noted that in accordance with the present invention, particulate material 50 may be of any suitable type. For example, particulate material 50 may be coarse sand or gravel, alumina, aluminum, steel shot, or any other solid particulate material, which may also be referred to herein as thermal transfer media. In addition, the particulate material may be of the chemical reacting type of a catalyst in a chemical reaction in order to transfer thermal energy, or may be of the non-chemical reacting type, which transfers thermal energy by contact between the particulate material and the incoming fluid.

In the present embodiment, the particulate material 50 which is employed is coarse sand and is supplied by hopper 52 to upper vessel 20 of reactor 12. As explained in U.S. Pat. No. 3,876,383, sand 50 passes through perforated trays 24, so that there is a pile of sand 50 in lower vessel 18. In this manner, as hot gases 26 are received via conduit 32 into lower vessel 18, these hot gases make initial contact with the sand in lower vessel 18, and then the hot gases pass upwardly through the perforated trays 24. While the exhaust gases 26 are moving upwardly through reactor 12, the cold, coarse sand 50 is dropping downwardly from hopper 52 through the stack of trays 24, so that the sand 50 and hot gases 26 thermally interact with each other to heat the sand 50. As will be understood from the aforesaid patent, gas velocities through the perforations of trays 24 are much higher than the settling velocity of the individual sand particles 50, whereas the gas velocities above trays 24 are too low to permit sand entrainment. The resulting action is the formation of a fluid bed of sand 2 inches to 6 inches deep on the top of each tray 24. Retention of the sand in this manner permits almost perfect thermal exchange between the sand bed and gases 26. Sand from each bed continuously discharges through trays 24 due to the "boiling" action of the sand above the large number of tray perforations. At any given time, there is slightly more sand above a particular tray perforation than above others. As a result, gas flow, seeking the path of least resistance, is thus diverted to other perforations allowing sand to flow through that particular perforation unhindered until equilibrium is regained. This action is randomly repeated from perforation to perforation at each tray and results in controlled counterflow action between the sand particles 50 and the exhaust gases 26. Retention at each bed is self-regulated for different sand and gas flow rates. The net result is the ability to discharge sand from upper reactor 12 at a temperature very close to the temperature of incoming exhaust gases 26. Additionally, after exhaust gases 26 pass through lower vessel 18 and trays 24, they enter upper vessel 20 substantially cooled. These cooled exhaust gases, designated by arrow 60, enter upper vessel 20 at a temperature very close to the temperature of incoming sand 50 received from hopper 52.

In this particular embodiment, cooled gases 60 have a temperature in the range of 250° F. to 350° F., and these gases are withdrawn from upper vessel 20 by a suitable fan 62. In the preferred embodiment, if desired, these gases 60 are sent through a cyclone 64 to remove spent sand, cinders, dust, and the like. From fan 62 and cyclone 64, gases 60 are sent by a suitable conduit 66 to conduit 38 to join the gases in conduit 38 which are then supplied by fan 40 to the air pollution control system 42, as explained above.

In addition, duct 68 adjacent cyclone 64 may be provided with a suitable thermocouple 70 which senses the temperature of the gases 60 in conduit 68 and operates to control, via line 72, a damper 74 disposed in conduit 66. Damper 74 is normally maintained in an open position. However, if thermocouple 70 senses that gases 60 are above a predetermined temperature, then thermocouple 70 will operate to close or partially close damper 74 so that the rate at which hot exhaust gases 26 are drawn into reactor 12 is regulated to maintain gases 60 below a predetermined temperature.

As noted above, the gases 60 entering upper vessel 20 in reactor 12 are sufficiently cooled so that all of the equipment through which gases 60 pass after leaving upper vessel 20 does not have to be built to withstand high-temperature fluids. Therefore, cyclone 64, conduits 66, 68, and fan 62, and all other related equipment are much less expensive, since they do not have to be built to withstand high-temperature fluids. Moreover, if heat exchanger 34 was not in parallel with upper reactor 12, but in series with it, so that the gases exiting from reactor 12 would then be supplied to heat exchanger 34, then all of the equipment between reactor 12 and a series-arranged heat exchanger 34 would have to be built to withstand high-temperature fluids. However, in accordance with the present invention, only an amount of hot gases 26 is drawn into reactor 12 which is needed to meet the system's demands, so that the remaining and unused gases 26 are supplied at a high temperature to the parallel-arranged heat exchanger 34. In this manner, as reactor 12 only draws in the amount of hot gases 26 needed, after such gases pass through lower vessel 18 and enter upper vessel 20, they are sufficiently cooled so that gases 60 can be sent through the equipment shown which does not have to be specially designed to withstand high-temperature fluids.

As explained above, sand 50 is heated as it passes through upper reactor 12 and then passes into a hopper arrangement 80 mounted on the bottom of reactor 12 for supplying the hot sand 50, through open passageway 82, to insulated storage device 16. As will be noted, hot sand 50 passes through passageway 82 into storage device 16 by gravity and without any valve or other moving parts being located in passageway 82, so that hot sand 50 is free to flow therethrough. As shown, the walls of storage device 16 are insulated with any suitable material 84, such as insulated mineral fiber. It should also be noted that storage device 16 stores the hot sand received therein from upper reactor 12 in a very efficient manner, since the hot sand 50 stored therein loses less than 100° of temperature in a 24-hour period. At the upper end of storage device 16, there is mounted an upper level sensor and controller 90 for sensing the level of hot sand 50 within storage device 16. In addition, at the lower end of storage device 16, there is mounted a lower level sensor and controller 92 for sensing the level of hot sand 50 in storage device 16. As will be explained herein, level sensors 90, 92 operate to control the rate at which particulate material 50 is returned from lower reactor 14 to upper reactor 12 and also controls the rate at which hot gases 26 are supplied to upper reactor 12. Hot sand 50 flows by gravity from storage device 16 to lower reactor 14. However, a 5-foot high sand seal 94 is provided at the outlet of storage device 16 which operates to prevent the cold fluid to be heated within lower reactor 14 from entering the storage device 16 or the upper reactor 12. The hot sand 50 is withdrawn from storage device 16 and sand seal 94 through a suitable transfer valve 96 located in the lower end of sand seal 94. As will be explained, hot sand 50 is withdrawn through transfer valve 96 at a rate required to maintain the fluid 106 to be heated in lower reactor 14 at a predetermined constant temperature, as long as there is hot sand stored in storage device 16.

The lower reactor 14 is provided with conduits 100, 102 and a suitable fan 104 for supplying the working fluid 106 to lower reactor 14 to be heated. In addition, lower reactor 14 is provided with a stacked arrangement of perforated trays 108, which are similar in construction and operation to the above-described trays 24 in upper reactor 12. Again, reference is made to U.S. Pat. No. 3,876,383 for a full and detailed explanation of the operation of such trays within the lower reactor 14. In the embodiment illustrated, the working fluid 106 to be heated in lower reactor 14 is air, and the hot sand-air thermal interaction in lower reactor 12 is similar to that described above in upper reactor 12, except that the action is reversed, with the hot sand 50 thermally reacting with air 106 to give up its thermal energy or heat.

The hot sand passes from sand seal 94 through the perforated trays 108 and is discharged from the bottom of lower reactor 14 into a sand storage hopper 110 provided at the bottom of lower reactor 14. When the sand 50 leaves the lowermost tray 108, the temperature of the sand has been reduced to approximately 130° F. The blast air 106 is supplied via conduit 102 to the bottom of lower reactor 14, just above sand hopper 110. The blast air 106 passes upwardly through trays 108 in the same manner as explained above with respect to hot gases 26 passing upwardly through perforated trays 24. As a result, the air 106 is heated by the hot sand 50, and the heated working fluid or air, designated by arrow 114, is discharged from the top of lower reactor 14 via a duct 112 which transfers the heated working fluid to its utilization point. When the present invention is used in conjunction with a cupola, the duct 112 provides the heated air 114 to the cupola windbox 142. Of course, the heated working fluid 114 can be provided to any desired utilization point.

In addition, a thermocouple 142 is provided in duct 112 to sense the temperature of heated working fluid 114. If it is below the desired temperature, thermocouple 142 operates to adjust the opening of valve 96 to increase the flow of hot sand to heat air 106 in reactor 14.

The sand 50 stored in hopper 110 is recirculated to the top of upper reactor 12 by any suitable conveyor apparatus 54, such as a pneumatic sand-lift system, which elevates the sand from storage hopper 110 to the top of upper reactor 12 through a vertically-arranged pipe 116. A positive displacement air blower 118 is employed to force air through the pneumatic sand-lift system, and the air and sand are mixed at 120, with the forced air operating to lift the sand to upper hopper 52. As explained above, the sand flows from hopper 52 into upper reactor 12 by gravity. The forced air employed in the pneumatic sand-lift system is discharged from upper reactor 12 with the waste gases 60.

We now turn to a description of the controls and operation of the waste heat recovery and storage system of the present invention. A thermocouple 122 is disposed in conduit 30 and senses the temperature of the incoming exhaust gases 26. Thermocouple 122 is set at a predetermined temperature, for example 1400° F., and will operate via switch 124 to actuate level sensors and controllers 90, 92. In operation, if the incoming gases 26 are below the preset temperature of 1400° F., thermocouple 122 and switch 124 operate to switch on lower level sensor 92. However, when the incoming gases 26 are at or above the preset temperature, thermocouple 122 and switch 124 operate to switch on upper level sensor 90.

In addition, switch 124 is connected via line 126 to the motorized damper control 128 for damper 130. In this manner, upper and lower level sensors 90, 92 operate via switch 124 to control the rate at which sand is returned from lower hopper 110 to upper hopper 52.

In operation, when incoming exhaust gases 26 are at a temperature of less than the preset temperature of 1400° F., thermocouple 122 and switch 124 operate to switch on lower level sensor 92. During this time, as long as there is hot sand in storage device 16 being supplied to lower reactor 14, lower level sensor 92 senses this and operates to close damper 130 so that no sand is circulated from lower hopper 110 through the pneumatic lift system 54 to upper hopper 52. As a result, the temperature of gases 60 will rise, and thermocouple 70 will operate to close damper 74 in conduit 66 and stop the supply of exhaust gases 26 into upper reactor 12 while they are below the preset level of 1400° F. However, if the level of stored sand in storage device 16 is low, and the temperature of incoming gases 26 is still below 1400° F., lower level sensor 92 senses that the supply of hot sand in storage device 16 is running out and operates via line 126 to open damper 130 and to start the circulation of sand from lower hopper 110 to upper hopper 52. As a result, since gases 26 and sand 50 will interact, the temperature of gases 60 will decrease, and thermocouple 70 will cause damper 74 in conduit 66 to open and draw the hot exhaust gases 26 into upper reactor 12, even though they are below the preset temperature of 1400° F. However, the amount of sand circulated and the amount of hot gases 26 drawn into lower reactor 12 are only enough to meet the process requirements of lower reactor 14 to maintain working fluid 114 at the predetermined constant temperature or as close to it as possible. Therefore, during this time period, there will be no build up or storage of hot sand in storage device 16, since only a sufficient amount is circulated to meet the requirements of the system.

As soon as the temperature of the incoming exhaust gases 26 reaches the preset level of 1400° F., thermocouple 122 and switch 124 operate to open damper 130 to the maximum so that the rate of supply of sand from lower hopper 110 will be increased to its maximum. As a result, sand 50 and gases 26 interact so that the temperature of gases 60 decreases. This is sensed by thermocouple 70 and opens damper 74 so that upper reactor 12 operates to draw in the maximum amount of exhaust gases 26. In this manner, more sand will be supplied to upper reactor 12 than is being utilized in lower reactor 14, and there will be a build up or storage of hot sand in the insulated storage device 16. The rate at which sand is supplied to upper hopper 52 will continue at the maximum, and the drawing of gases 26 into lower reactor 12 will also continue at the maximum, until the level of stored hot sand in storage device 16 reaches the level of level sensor and controller 90. At that time, level sensor 90 and switch 124 operate via line 126 to adjust the opening of damper 130 to decrease the rate at which sand is supplied from lower hopper 110 to upper hopper 52 which in turn operates to decrease the rate at which exhaust gases 26 are drawn into upper reactor 12. These rates are slowed down so that they are just sufficient to meet and supply the amount of hot sand being drawn into lower reactor 14. Of course, it will be understood that the sand rate and gas rate will be adjusted to vary in accordance with the demands of lower reactor 14. This mode of operation will continue so long as the temperature of incoming gases 26 are above 1400° F. and as long as storage device 16 is full. However, if during this mode of operation, the temperature of incoming gases 26 drops below 1400° F., thermocouple 122 and switch 124 will operate via line 126 to close damper 130 and to stop the flow of sand to upper hopper 52, which in turn will close damper 74 and stop the drawing in of gases 26 into upper reactor 12. Switch 124 will also automatically turn off upper level sensor 90 and switch on lower level sensor 92. Since no sand is being circulated to upper hopper 52, the hot sand stored in storage device 16 will be utilized to meet the demand requirements of lower reactor 14 to maintain working fluid 114 at the predetermined constant temperature. However, if the temperature of incoming gases 26 returns to a level above 1400° F., sand will again be circulated at its maximum rate from lower hopper 110 to upper hopper 52, and damper 74 will open so that the maximum rate of hot gases 26 is drawn into reactor 12 until storage device 16 is again filled with hot sand.

In view of the foregoing, it will be realized that the waste heat recovery and storage system of the present invention operates to maintain the temperature of working fluid 114 at a predetermined constant level, so long as there is hot sand stored in storage device 16, regardless of the varying temperature of incoming exhaust gases 26. This is accomplished as a result of providing storage device 16 to supply heated sand to lower reactor 14 to heat working fluid 114 during those times when the incoming exhaust gases are less than the predetermined level of 1400° F. As a result, the waste heat recovery and storage system of the present invention has a higher process or system efficiency than a system which has no storage capability. In addition, the present invention also has a higher process efficiency, since it only draws as much hot exhuast gases as needed to meet the demands of lower reactor 14, thereby leaving the remaining unused balance of exhaust gases 26 for other purposes, such as providing heat to a parallel heat exchanger 34. As a further benefit of the present invention, since upper reactor 12 only draws in the amount of hot gases 26 which it needs, the gases 60 expelled from upper reactor 12 are substantially cooler so that the cyclone 64, fan 62, and other peripheral equipment do not have to be built to withstand high temperatures and therefore further decrease the cost of the present system.

As a further alternative to the present invention, a burner 140 can be mounted on hopper 80 to further heat sand 50 before it enters storage device 16. Preferably, burner 140 can be employed to heat sand 50 when exhaust gases 26 are being drawn into reactor 12, even though they are below the 1400° F. level. This will insure that fluid 114 will always be maintained at the predetermined constant temperature level.

As a still further embodiment, the present invention also envisions using any means for imparting heat energy to heat sand 50 (or other media), instead of using hot exhaust gases 26. For example, solar energy can be harnessed such that the solar rays directly impart heat energy to the particulate material or media, rather than using exhaust gases 26.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method of recovering heat energy from a hot fluid in a system including a first heat exchange chamber, a second heat exchange chamber, and a storage device communicating with both said first and second chambers, including the steps of:
   supplying particulate material to said first chamber,
   circulating the hot fluid through said first chamber so that said particulate material thermally interacts with and receives heat energy from said hot fluid,
   transferring said heated particulate material from said first chamber to said storage device to store said heated particulate material for use as needed,
   supplying said heated particulate material as needed from said storage device to said second chamber,
   circulating a working fluid to be heated through said second chamber so that it thermally interacts with and receives a desired amount of heat energy from said particulate material, and
   sensing a condition of said working fluid and, in response thereto, controlling the supply of heated particulate material from said storage device to said second chamber to maintain said supply of working fluid at a predetermined constant condition.

2. A method in accordance with claim 1 further including the step of returning said particulate material from said second chamber to said first chamber to reuse same.

3. A method in accordance with claim 1 wherein said particulate material and said hot fluid pass through said first chamber in opposite directions.

4. A method in accordance with claim 1 wherein said particulate material and said working fluid pass through said second chamber in opposite directions.

5. A method in accordance with claim 1 further including the step of sensing the temperature of said working fluid and, in response thereto, controlling the supply of heated particulate material from said storage device to said second chamber to maintain said supply of working fluid at a predetermined constant temperature.

6. A method in accordance with claim 1 further including the step of controlling the return of said particulate material from said second chamber to said first chamber in response to the flow rate of said particulate material from said storage device to said second chamber.

7. A method in accordance with claim 1 further including the step of sensing the temperature of said hot fluid as it leaves said first chamber and, in response thereto, controlling the supply of said hot fluid to said first chamber.

8. A method in accordance with claim 1 further including the step of sensing the level of heated particulate material stored in said storage device and, in response thereto, controlling the supply of particulate material to said first chamber and the supply of hot fluid to said first chamber.

9. A method in accordance with claim 1 further including the step of sensing the level of heated particulate material stored in said storage device and, in response thereto, controlling the flow rate of said particulate material to said first chamber from said second chamber.

10. A method in accordance with claim 1 wherein said storage device includes an upper level sensor and a lower level sensor for sensing the level of particulate material in said storage device, further including the step of sensing the temperature of said hot fluid supplied to said first chamber and, in response thereto, actuating said upper or lower level sensor to be operative.

11. A method in accordance with claim 1 further including the step of sensing the temperature of said hot fluid as it enters said first chamber and, in response thereto, controlling the supply of hot fluid to said first chamber.

12. A method in accordance with claim 1 further including the step of supplying a portion of said hot fluid to a third chamber for supplying heat energy thereto.

13. A method in accordance with claim 1 further including the step of supplying heat energy from a different source to further supply heat energy to said heated particulate material.

14. A waste heat recovery and storage system, comprising:
- a first heat exchange chamber having an inlet and an outlet for passing a hot fluid therethrough,
- a second heat exchange chamber having an inlet and an outlet for passing a working fluid to be heated therethrough,
- a storage device connected to said first heat exchange chamber to receive particulate material therefrom and connected to said second heat exchange chamber to supply particulate material thereto,
- means for circulating said particulate material from said first heat exchange chamber to said storage device and from said storage device to said second heat exchange chamber for thermally interacting with and exchanging heat with said hot fluid passing through said first chamber, and for thereafter transferring said heated particulate material to said storage device which stores said heated particulate material and for thereafter transferring said heated particulate material as needed to said second chamber for thermally interacting with and exchanging heat with said working fluid to supply heat energy thereto, and
- means for regulating the flow of particulate material from said storage device to said second chamber in response to a condition of said working fluid to be treated.

15. A system in accordance with claim 14 wherein said storage device includes means for regulating the flow of particulate material from said storage device to said second chamber in response to the temperature of said working fluid to be heated.

16. A system in accordance with claim 14 wherein said storage device includes an upper level sensor for sensing the level of said particulate material adjacent the top of said storage device and a lower level sensor for sensing the level of said particulate material in said storage device adjacent the lower end of said storage device.

17. A system in accordance with claim 16 further including means for sensing the temperature of said hot fluid being supplied to said first chamber, and means responsive to said temperature-sensing means for energizing said upper or lower level sensors.

18. A system in accordance with claim 17 further including means for controlling the flow rate of particulate material from said second chamber to said first chamber in response to said level sensors and said temperature-sensing means.

19. A system in accordance with claim 14 wherein said storage device is insulated to preserve the heat energy stored therein.

20. A system in accordance with claim 14 wherein said circulating means includes means for supplying said particulate material in a direction opposite to the flow of said hot fluid and said working fluid.

21. A method of utilizing energy from a supply of energy in a system including a first heat exchange chamber, a second heat exhange chamber, and a storage device communicating with both said first and second chambers, including the steps of:
- supplying particulate material at a first temperature to said first chamber,
- supplying energy from said energy supply at a second temperature different from said first temperature to said first chamber so that said particulate material thermally interacts with and exchanges energy with said energy supply,
- transferring said particulate material from said first chamber to said storage device to store said particulate material for use as needed,
- supplying said particulate material as needed from said storage device to said second chamber,
- circulating a second fluid through said second chamber so that it thermally interacts with and exchanges energy with said particulate material, and
- sensing a condition of said second fluid and, in response thereto, controlling the supply of particulate material from said storage device to said second chamber to maintain said supply of said second fluid at a predetermined constant condition.

22. A method in accordance with claim 21 wherein said energy supply is solar energy and imparts heat energy to said particulate material.

23. A method in accordance with claim 21 wherein said second temperature of said energy supply is less than said first temperature.

24. A method in accordance with claim 21 further including the step of returning said particulate material from said second chamber to said first chamber to reuse same.

25. A method in accordance with claim 21 further including the step of controlling the supply of particulate material from said storage device to said second chamber to maintain said second fluid at a predetermined constant temperature.

* * * * *